United States Patent
Shima

(10) Patent No.: US 12,262,014 B2
(45) Date of Patent: *Mar. 25, 2025

(54) IMAGE ENCODING APPARATUS, IMAGE DECODING APPARATUS, CONTROL METHODS THEREOF, AND NON-TRANSITORY COMPUTER-READABLE STORAGE MEDIUM

(71) Applicant: CANON KABUSHIKI KAISHA, Tokyo (JP)

(72) Inventor: Masato Shima, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/512,585

(22) Filed: Nov. 17, 2023

(65) Prior Publication Data

US 2024/0089444 A1  Mar. 14, 2024

Related U.S. Application Data

(63) Continuation of application No. 17/347,352, filed on Jun. 14, 2021, now Pat. No. 11,849,114, which is a
(Continued)

(30) Foreign Application Priority Data

Dec. 17, 2018  (JP) ................................ 2018-235912

(51) Int. Cl.
*H04N 19/126* (2014.01)
*H04N 19/159* (2014.01)
(Continued)

(52) U.S. Cl.
CPC ......... *H04N 19/126* (2014.11); *H04N 19/159* (2014.11); *H04N 19/176* (2014.11); *H04N 19/18* (2014.11); *H04N 19/91* (2014.11)

(58) Field of Classification Search
CPC .. H04N 19/126; H04N 19/159; H04N 19/176; H04N 19/18; H04N 19/91;
(Continued)

(56) References Cited

U.S. PATENT DOCUMENTS

| 2007/0297504 A1* | 12/2007 | Reznik ................. H04N 19/61 375/240 |
| 2013/0182971 A1* | 7/2013 | Leontaris .............. G06T 7/0002 382/275 |
| 2018/0288410 A1* | 10/2018 | Park ..................... H04N 19/157 |

FOREIGN PATENT DOCUMENTS

| CN | 103096056 A | 5/2013 |
| CN | 104170382 A | 11/2014 |

(Continued)

OTHER PUBLICATIONS

Benjamin Bross, et al., Versatile Video Coding (Draft 3), Joint Video Experts Team (JVET) of ITU-T SG 16 WP 3 and ISO/IEC JTC 1/SC 29/WG 11, 12th Meeting: Macao, CN, Oct. 3-12, 2018, Document No. JVET-L1001-v7.

(Continued)

*Primary Examiner* — Dramos Kalapodas
(74) *Attorney, Agent, or Firm* — Canon U.S.A., Inc. IP Division

(57) ABSTRACT

The present invention provides an image encoding apparatus for encoding a sequence of images, where the apparatus comprises a prediction unit which generates, for a target block to be encoded having a predetermined size in an image, a predicted image from both an intra-prediction image and an inter-prediction image, and obtains prediction errors that are differences between the target block and the predicted image; a transform unit which frequency-transforms the prediction errors, a quantization unit which quantize, using a quantization matrix, the transform coefficients, and an encoding unit which entropy-encodes quantized (Continued)

transform coefficients, wherein the quantization unit obtains the quantization matrix, using at least one of a predetermined quantization matrix for the intra-prediction and a predetermined quantization matrix for inter-prediction.

8 Claims, 11 Drawing Sheets

Related U.S. Application Data continuation of application No. PCT/JP2019/041916, filed on Oct. 25, 2019.

(51) Int. Cl.
*H04N 19/176* (2014.01)
*H04N 19/18* (2014.01)
*H04N 19/91* (2014.01)

(58) Field of Classification Search
CPC ...... H04N 19/463; H04N 19/13; H04N 19/46; H04N 19/513; H04N 19/593
See application file for complete search history.

(56) References Cited

FOREIGN PATENT DOCUMENTS

| | | |
|---|---|---|
| CN | 104412592 A | 3/2015 |
| CN | 107113425 A | 8/2017 |
| CN | 107277524 A | 10/2017 |
| KR | 20060089691 A | 8/2006 |
| WO | WO-2012173063 A1 * | 12/2012 ............. H04N 19/11 |

OTHER PUBLICATIONS

Blasi, Saverio, et al., "Enhanced Inter-Prediction Using Merge Prediction Transformation in the HEVC Codec," School of Electronic Engineering and Computer Science, 2013 IEEE International Conference on Acoustic, Speech and Signal Processing, p. 1-6, Oct. 21, 2013.

Hongwei, Li, Research on Several Key Technologies of HEVC, University of Electronic Science and Technology, Wanfang Database, Jul. 31, 2012.

* cited by examiner

F I G. 6A
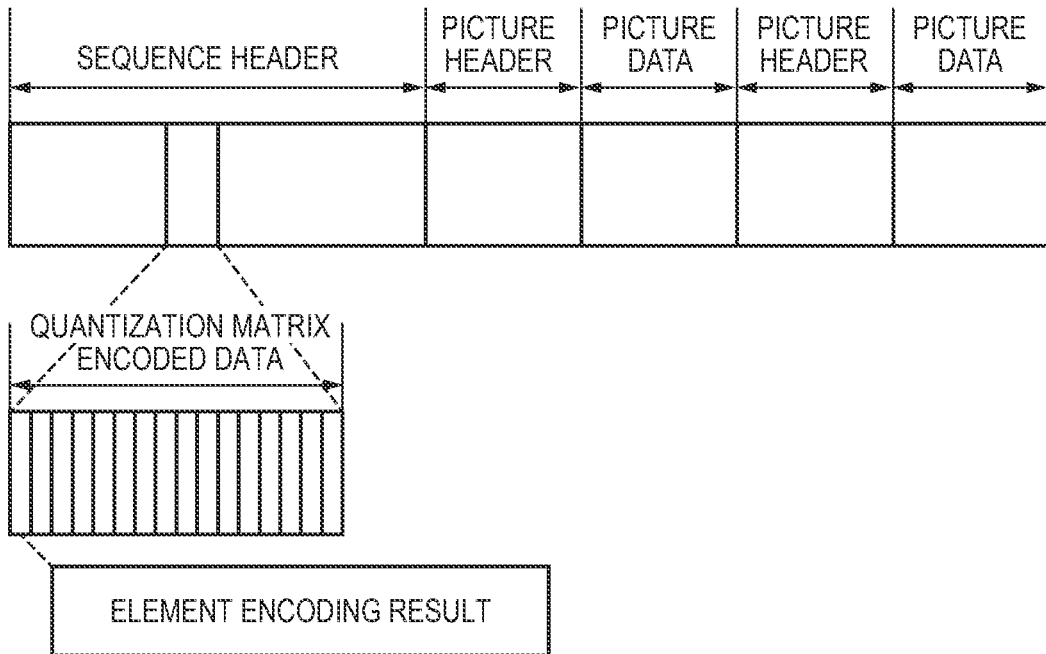
F I G. 6B
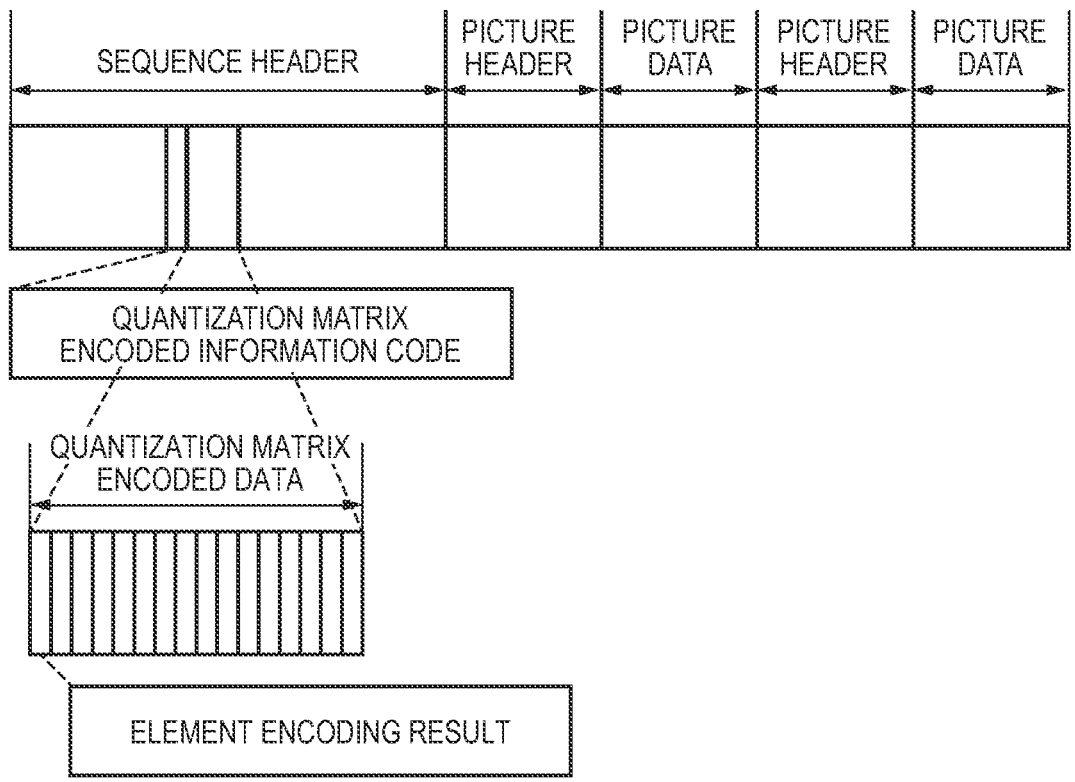

FIG. 8A

| 6 | 10 | 13 | 16 | 18 | 23 | 25 | 27 |
|---|----|----|----|----|----|----|----|
| 10 | 11 | 16 | 18 | 23 | 25 | 27 | 29 |
| 13 | 16 | 18 | 23 | 25 | 27 | 29 | 31 |
| 16 | 18 | 23 | 25 | 27 | 29 | 31 | 33 |
| 18 | 23 | 25 | 27 | 29 | 31 | 33 | 36 |
| 23 | 25 | 27 | 29 | 31 | 33 | 36 | 38 |
| 25 | 27 | 29 | 31 | 33 | 36 | 38 | 40 |
| 27 | 29 | 31 | 33 | 36 | 38 | 40 | 42 |

| 9 | 13 | 15 | 17 | 19 | 21 | 22 | 24 |
|---|----|----|----|----|----|----|----|
| 13 | 13 | 17 | 19 | 21 | 22 | 24 | 25 |
| 15 | 17 | 19 | 21 | 22 | 24 | 25 | 27 |
| 17 | 19 | 21 | 22 | 24 | 25 | 27 | 28 |
| 19 | 21 | 22 | 24 | 25 | 27 | 28 | 30 |
| 21 | 22 | 24 | 25 | 27 | 28 | 30 | 32 |
| 22 | 24 | 25 | 27 | 28 | 30 | 32 | 33 |
| 24 | 25 | 27 | 28 | 30 | 32 | 33 | 35 |

| 8 | 11 | 14 | 17 | 19 | 22 | 24 | 26 |
|---|----|----|----|----|----|----|----|
| 11 | 12 | 17 | 19 | 22 | 24 | 26 | 27 |
| 14 | 17 | 19 | 22 | 24 | 26 | 27 | 29 |
| 17 | 19 | 22 | 24 | 26 | 27 | 29 | 31 |
| 19 | 22 | 24 | 26 | 27 | 29 | 31 | 33 |
| 22 | 24 | 26 | 27 | 29 | 31 | 33 | 35 |
| 24 | 26 | 27 | 29 | 31 | 33 | 35 | 37 |
| 26 | 27 | 29 | 31 | 33 | 35 | 37 | 39 |

802

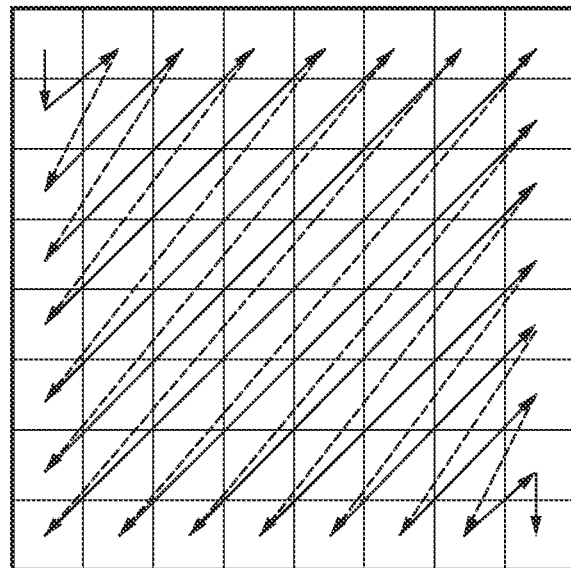
F I G. 9
F I G. 10A 1000
| -2 | 4 | 0 | 3 | -2 | 2 | 3 | 0 | 0 | 0 | 2 | 0 | 0 | 0 | 0 | ... |
F I G. 10B 1001
| 1 | 4 | 0 | 2 | -2 | 2 | 2 | 0 | 0 | 0 | 2 | 0 | 0 | 0 | 0 | ... |
F I G. 10C 1002
| 0 | 3 | 0 | 3 | -2 | 2 | 3 | 0 | 0 | 0 | 2 | 0 | 0 | 0 | 0 | ... |

FIG. 11A

| ENCODING TARGET VALUE | BINARY CODE |
|---|---|
| ... | ... |
| -5 | 0001011 |
| -4 | 0001001 |
| -3 | 00111 |
| -2 | 00101 |
| -1 | 011 |
| 0 | 1 |
| 1 | 010 |
| 2 | 00100 |
| 3 | 00110 |
| 4 | 0001000 |
| 5 | 0001010 |
| ... | ... |

FIG. 11B

| ENCODING TARGET VALUE | BINARY CODE |
|---|---|
| ... | ... |
| -5 | 0001011 |
| -4 | 0001001 |
| -3 | 00111 |
| -2 | 0010 |
| -1 | 011 |
| 0 | 11 |
| 1 | 10 |
| 2 | 010 |
| 3 | 00110 |
| 4 | 0001000 |
| 5 | 0001010 |
| ... | ... |

IMAGE ENCODING APPARATUS, IMAGE DECODING APPARATUS, CONTROL METHODS THEREOF, AND NON-TRANSITORY COMPUTER-READABLE STORAGE MEDIUM

CROSS-REFERENCE TO RELATED APPLICATIONS

This application is a Continuation of U.S. patent application Ser. No. 17/347,352, filed on Jun. 14, 2021, which is a Continuation of International Patent Application No. PCT/JP2019/041916, filed Oct. 25, 2019, which claims the benefit of Japanese Patent Application No. 2018-235912, filed Dec. 17, 2018, both of which are hereby incorporated by reference herein in their entirety.

BACKGROUND OF THE INVENTION

Field of the Invention

The present invention relates to an image encoding apparatus, an image decoding apparatus, control methods thereof, and non-transitory computer-readable storage medium.

Background Art

As an encoding method for moving image compression recording, an HEVC (High Efficiency Video Coding) encoding method (to be referred to as HEVC hereinafter) is known. In the HEVC, to improve the encoding efficiency, a basic block having a size larger than a conventional macro block (16 pixels×16 pixels) is employed. The basic block with the large size is called a CTU (Coding Tree Unit), and its size is 64 pixels×64 pixels at maximum. The CTU is further divided into sub-blocks each of which is a unit to perform prediction or transform.

Also, the HEVC uses processing of adding a weight to coefficients (to be referred to as orthogonal transform coefficients hereinafter) after orthogonal transform, which are called a quantization matrix, based on a frequency component. By further decreasing the data of a high-frequency component whose degradation is unnoticeable to human vision, the compression efficiency can be made high while maintaining image quality. PTL 1 discloses a technique of encoding such a quantization matrix.

In recent years, actions have been launched to implement international standardization of an encoding method of a higher efficiency as a replacement of the HEVC. JVET (Joint Video Experts Team) was founded between ISO/IEC and ITU-T, and standardization of a VVC (Versatile Video Coding) encoding method (to be referred to as VVC hereinafter) has been promoted. To improve the encoding efficiency, in addition to conventional intra-prediction and inter-prediction, a new prediction method (to be referred to as weighted intra-/inter-prediction hereinafter) using both intra-predicted pixels and inter-predicted pixels has been examined.

CITATION LIST

Patent Literature

PTL 1: Japanese Patent Laid-Open No. 2013-38758

SUMMARY OF INVENTION

In the VVC as well, introduction of a quantization matrix has been examined, like the HEVC. However, the quantization matrix in the HEVC is based on a conventional prediction method such as intra-prediction or inter-prediction, and does not correspond to weighted intra-/inter-prediction that is a new prediction method. For this reason, quantization control according to a frequency component cannot be performed for an error of weighted intra-/inter-prediction, and subjective image quality cannot be improved.

The present invention has been made in consideration of the above-described problem, and provides a technique of enabling quantization processing using a quantization matrix corresponding to weighted intra-/inter-prediction and improving subjective image quality.

In order to solve this problem, for example, an image encoding apparatus according to the present invention has the following configuration. That is, there is provided an image encoding apparatus for encoding a sequence of images, comprising: a prediction unit configured to generate, for a target block to be encoded having a predetermined size in an image, a predicted image from both an intra-prediction image obtained by intra-prediction processing and an inter-prediction image obtained by inter-prediction processing, and obtain prediction errors that are a difference between the target block and the predicted image; a transform unit configured to frequency-transform the prediction errors obtained by the prediction unit; a quantization unit configured to quantize, using a quantization matrix, transform coefficients obtained by the transform unit; and an encoding unit configured to entropy-encode quantized transform coefficients obtained by the quantization unit, wherein the quantization unit obtains the quantization matrix to be used to quantize the transform coefficients obtained by the transform means, using at least one of a predetermined quantization matrix for the intra-prediction and a predetermined quantization matrix for inter-prediction.

According to the present invention, it is possible to perform quantization using a quantization matrix even for an error in a new prediction method using both intra-prediction pixels and inter-prediction pixels and improve subjective image quality.

Further features of the present invention will become apparent from the following description of exemplary embodiments with reference to the attached drawings.

BRIEF DESCRIPTION OF DRAWINGS

FIG. 6A is a view showing an example of a bitstream structure generated by the first embodiment;

FIG. 6B is a view showing an example of a bitstream structure generated by the first embodiment;

FIG. 8A is a view showing an example of a quantization matrix used in the embodiment;

FIG. 8B is a view showing an example of a quantization matrix used in the embodiment;

FIG. 8C is a view showing an example of a quantization matrix used in the embodiment;

FIG. 9 is a view showing a scanning method of an element of a quantization matrix;

FIG. 10A is a view showing a difference value matrix of a quantization matrix;

FIG. 10B is a view showing a difference value matrix of a quantization matrix;

FIG. 10C is a view showing a difference value matrix of a quantization matrix;

FIG. 11A is a view showing an example of an encoding table for a quantization matrix; and FIG. 11B is a view showing an example of an encoding table for a quantization matrix.

DESCRIPTION OF EMBODIMENTS

Embodiments according to the present invention will now be described in detail with reference to the accompanying drawings. Note that embodiments to be described below are merely examples, and the present invention is not limited to the illustrated configuration. For example, in the following explanation, terms such as "basic block" and "sub-block" are used. However, the embodiments can be applied to various processing units called "block" and "unit" in an image encoding technique.

First Embodiment

Figure 1:
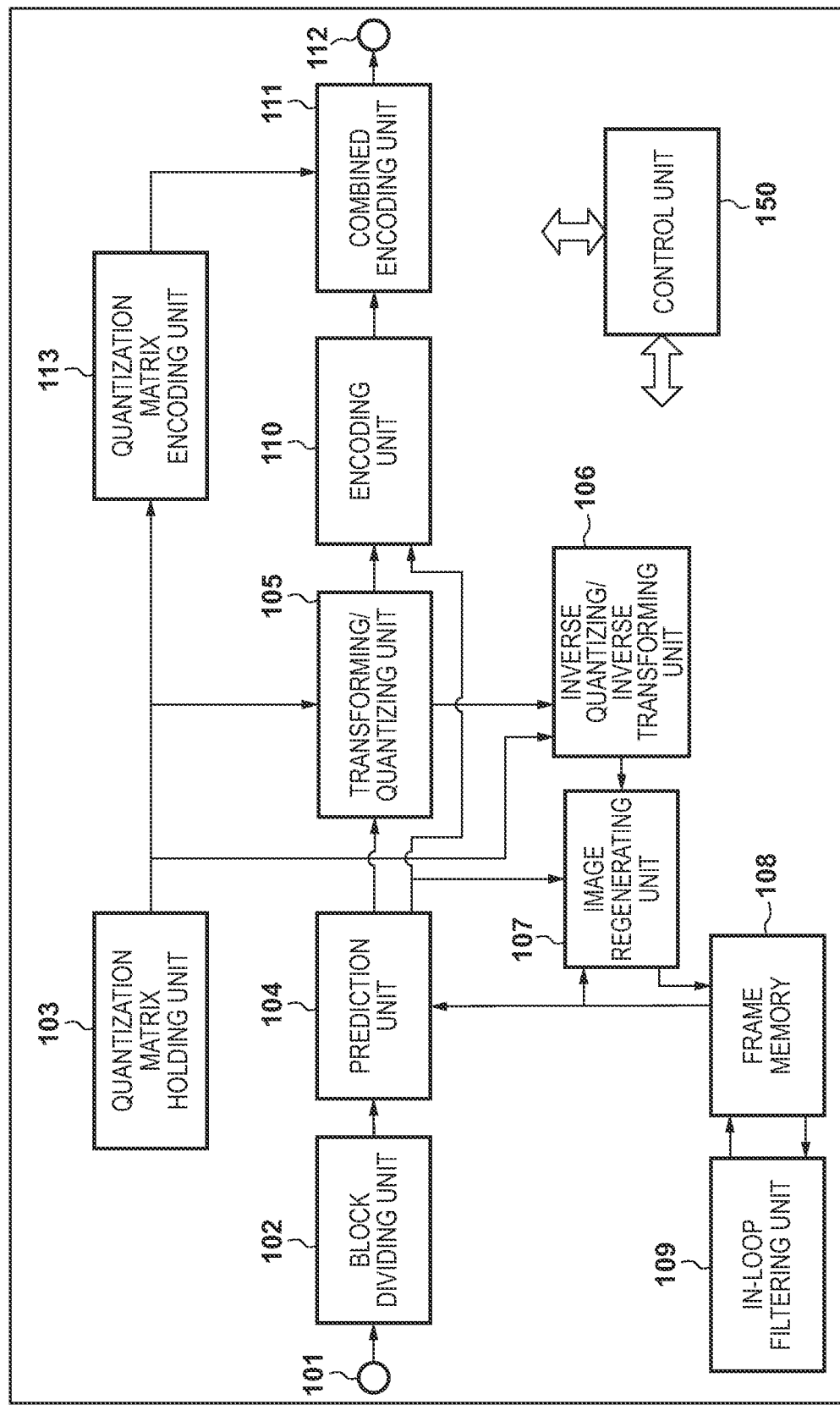
FIG. 1 is a block diagram showing the configuration of an image encoding apparatus according to the first embodiment.

FIG. 1 is a block diagram showing the configuration of an image encoding apparatus according to the first embodiment. The image encoding apparatus includes a control unit 150 configured to control constituent elements to be described below and perform control of the entire apparatus. The control unit 150 includes a CPU, a ROM that stores programs to be executed by the CPU, various kinds of parameters, and the like, and a RAM used as the work area of the CPU. Note that an OS (Operating System), programs, and parameters stored in the ROM or another nonvolatile storage device may be loaded into the RAM, and after that, the programs may be executed under the control of the OS.

In addition, the image encoding apparatus includes an input terminal 101, a block dividing unit 102, a quantization matrix holding unit 103, a prediction unit 104, a transforming/quantizing unit 105, an inverse quantizing/inverse transforming unit 106, an image regenerating unit 107, a frame memory 108, an in-loop filtering unit 109, an encoding unit 110, a combined encoding unit 111, an output terminal 112, and a quantization matrix encoding unit 113.

In the above-described configuration, image data (for example, 30 frames/sec) is supplied from an image generation source (not shown) to the input terminal 101 of the apparatus. Note that although the image generation source can be of any type, as simple examples, an image capturing unit or a video camera, or a hard disk or a storage medium storing encoding target image data can be used.

The block dividing unit 102 divides image data of one frame input via the input terminal 101 into a plurality of basic blocks and supplies image data of each basic block to the prediction unit 104 of the subsequent stage.

The quantization matrix holding unit 103 holds a plurality of quantization matrices to be used in quantization processing. A method of generating a quantization matrix to be held is not particularly limited. A user may input a quantization matrix, a quantization matrix may be calculated from the characteristic of an input image, or a quantization matrix designated in advance as an initial value may be used. In this embodiment, two-dimensional quantization matrices 800 to 802 corresponding to three types of orthogonal transform (frequency transform) of 8×8 pixels shown in FIGS. 8A to 8C are generated and held.

The prediction unit 104 performs sub-block division for the image data of each basic block, and performs intra-prediction that is prediction in a frame or inter-prediction that is prediction between frames on a sub-block basis, thereby generating predicted image data. Also, the prediction unit 104 calculates prediction error data from the image data and the predicted image data of a sub-block and outputs it. The prediction unit 104 also outputs information necessary for prediction, for example, information of sub-block division, a prediction mode, a motion vector, and the like together with the prediction error. The information necessary for prediction will be referred to as prediction information hereinafter.

The transforming/quantizing unit 105 performs orthogonal transform (frequency transform) of the prediction error data supplied from the prediction unit 104 on a sub-block basis, thereby obtaining transform coefficients. The transforming/quantizing unit 105 then quantizes the transform coefficients of a sub-block of interest using a corresponding quantization matrix held by the quantization matrix holding unit 103 (the transform coefficients after quantization will simply be referred to as "quantized coefficients" hereinafter).

The inverse quantizing/inverse transforming unit 106 inversely quantizes the quantized coefficients input from the transforming/quantizing unit 105 using a corresponding quantization matrix held by the quantization matrix holding unit 103, thereby regenerating (deriving) the transform coefficients. The inverse quantizing/inverse transforming unit 106 also performs inverse orthogonal transform of the transform coefficients, thereby regenerating the prediction error data.

The image regenerating unit 107 appropriately refers to the frame memory 108 based on the prediction information input from the prediction unit 104, thereby generating predicted image data. The image regenerating unit 107 generates regenerated image data from the generated predicted image data and the prediction error data from the inverse quantizing/inverse transforming unit 106, and outputs it to the frame memory 108 again.

The in-loop filtering unit 109 performs in-loop filtering processing such as deblocking filtering or sample adaptive offsetting for the regenerated image data from the image regenerating unit 107, which is stored in the frame memory 108, and stores the image data after the filtering processing in the frame memory 108 again.

The encoding unit 110 encodes the quantized coefficients input from the transforming/quantizing unit 105 and the prediction information input from the prediction unit 104, thereby generating and outputting encoded data.

The quantization matrix encoding unit 113 encodes a quantization matrix input from the quantization matrix holding unit 103, thereby generating and outputting encoded data of the quantization matrix.

The combined encoding unit 111 generates header encoded data using the encoded data of the quantization matrix that is the output from the quantization matrix encoding unit 113. Also, the combined encoding unit 111 forms a bitstream by combining the encoded data of the image input from the encoding unit 110 with the generated header encoded data, and outputs the bitstream to the outside via the output terminal 112.

Note that the output destination is not particularly limited and may be a storage device such as a recording medium or a file server on a network.

An image encoding operation of the image encoding apparatus according to the embodiment will be described below in more detail.

Figure 7A:
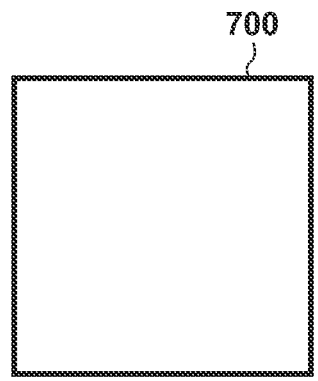
FIG. 7A is a view showing an example of sub-block division used in the embodiment.

First, the quantization matrix holding unit 103 generates a quantization matrix. The quantization matrix is generated in accordance with the size of a sub-block to be encoded or the type of the prediction method. In this embodiment, a quantization matrix having a size of 8×8 pixels corresponding to a basic block 700 of 8×8 pixels shown in FIG. 7A is generated. However, the quantization matrix to be generated is not limited to this, and a quantization matrix having a size of 4×8 pixels, 8×4 pixels, or 4×4 pixels corresponding to the shape of a sub-block may be generated. A method of deciding each element of a quantization matrix is not particularly limited. For example, a predetermined initial value may be used, or elements may individually be set. Alternatively, the elements may be generated in accordance with the characteristic of an image.

The quantization matrix holding unit 103 holds the thus generated quantization matrix. In FIGS. 8A to 8C, reference numerals 800 to 802 denote quantization matrices generated and held by the quantization matrix holding unit 103 according to the embodiment. The quantization matrix 800 shown in FIG. 8A represents a quantization matrix used for intra-prediction. The quantization matrix 801 shown in FIG. 8B represents a quantization matrix used for inter-prediction. The quantization matrix 802 shown in FIG. 8C represents a quantization matrix corresponding to weighted intra-/inter-prediction. Each of the quantization matrices 800 to 802 is formed by 8×8 elements (quantization step values), as shown in FIGS. 8A to 8C. In this embodiment, the three types of quantization matrices 800 to 802 shown in FIGS. 8A to 8C are held in a two-dimensional shape. However, the elements in the quantization matrices are not limited to these, as a matter of course. It is also possible to hold a plurality of quantization matrices in correspondence with the same prediction method depending on the size of a sub-block or depending on whether an encoding target is a brightness block or a color difference block. In general, a quantization matrix implements quantization processing according to the visual characteristic of a human. Hence, as shown in FIGS. 8A to 8C, an element for DC components corresponding to the upper left corner portion of each of the quantization matrices 800 to 802 is small, and an element for an AC component corresponding to the lower right portion is large.

The quantization matrix encoding unit 113 sequentially reads out the quantization matrices 800 to 802 stored in a two-dimensional shape from the quantization matrix holding unit 103, calculates differences by scanning the elements, and arranges the differences in a one-dimensional matrix. In this embodiment, a scanning method shown in FIG. 9 is used for the quantization matrices 800 to 802 shown in FIGS. 8A to 8C, and the difference between each element and an immediately preceding element is calculated in the scanning order. For example, the quantization matrix 802 of 8×8 pixels shown in in FIG. 8C is scanned by the scanning method shown in FIG. 9. Next to the first element "8" located at the upper left corner, an element "11" located immediately under that is scanned, and the difference "+3" is calculated. To encode the first element ("8" in this embodiment) of the quantization matrix 802, the difference from a predetermined initial value (for example, "8") is calculated. However, the value is not limited to this, as a matter of course, and the difference from an arbitrary value or the value of the first element itself may be used.

As described above, in this embodiment, from the quantization matrices 800 to 802 shown in FIGS. 8A to 8C, one-dimensional difference matrices 1000 to 1002 shown in FIGS. 10A to 10C are generated using the scanning method shown in FIG. 9. The quantization matrix encoding unit 113 further encodes the difference matrices 1000 to 1002, thereby generating quantization matrix encoded data. In this embodiment, encoding is performed using an encoding table shown in FIG. 11A. However, the encoding table is not limited to this, and, for example, an encoding table shown in FIG. 11B may be used. The thus generated quantization matrix encoded data are output to the combined encoding unit 111 of the subsequent stage.

Referring back to FIG. 1, the combined encoding unit 111 encodes header information necessary for encoding of image data and combines the encoded data of the quantization matrices 800 to 802. Encoding of image data will be described next.

The block dividing unit 102 divides image data of one frame input from the input terminal 101 into a plurality of basic blocks and supplies image data of each basic block to the prediction unit 104. In this embodiment, the size of a basic block is 8×8 pixels, as described above.

The prediction unit 104 executes prediction processing for the image data of the basic block input from the block dividing unit 102. More specifically, the prediction unit 104 decides a sub-block dividing method of dividing the basic block into finer sub-blocks, and decides a prediction mode such as intra-prediction, inter-prediction, or weighted intra-/inter-prediction on a sub-block basis.

Figure 7B:
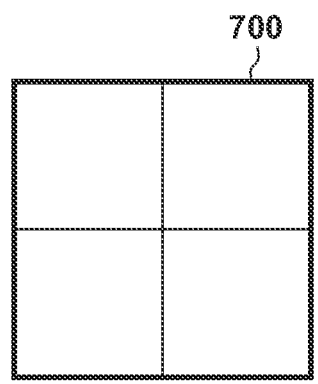
FIG. 7B is a view showing an example of sub-block division used in the embodiment.
Figure 7C:
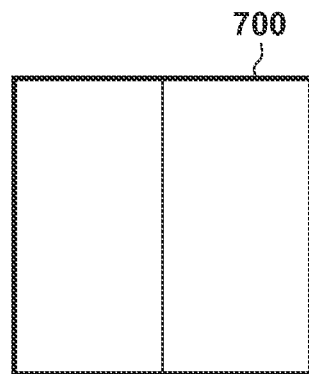
FIG. 7C is a view showing an example of sub-block division used in the embodiment.
Figure 7D:
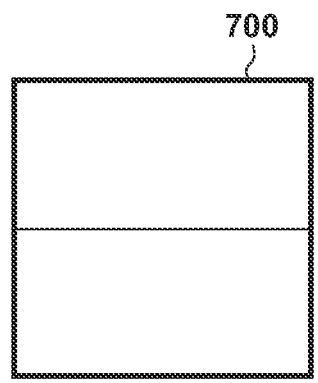
FIG. 7D is a view showing an example of sub-block division used in the embodiment.
Figure 7E:
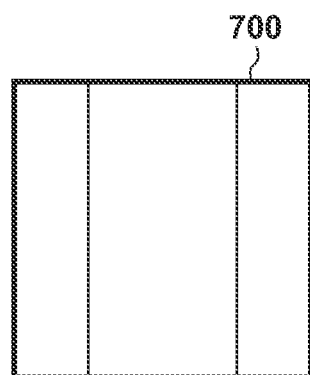
FIG. 7E is a view showing an example of sub-block division used in the embodiment.
Figure 7F:
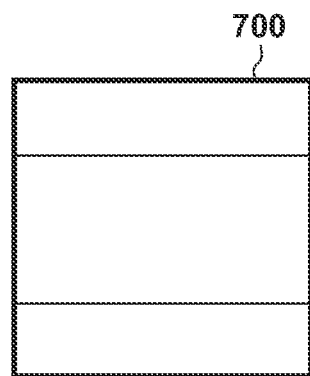
FIG. 7F is a view showing an example of sub-block division used in the embodiment.

FIGS. 7A to 7F show examples of sub-block division patterns. Reference numeral 700 indicating a thick frame on the outer side in each of FIGS. 7A to 7F denotes a basic block, which has a size of 8×8 pixels in the embodiment. Each rectangle in the thick frame represents a sub-block. FIG. 7A shows an example of basic block=sub-block. FIG. 7B shows an example of conventional square sub-block division, and the basic block 700 of 8×8 pixels is divided into four sub-blocks each having a size of 4×4 pixels. On the other hand, FIGS. 7C to 7F show examples of rectangular sub-block division. FIG. 7C shows an example of dividing the basic block 700 into two vertically long sub-blocks each having a size of 4×8 pixels. FIG. 7D shows an example of dividing the basic block 700 into two horizontally long sub-blocks each having a size of 8×4 pixels. FIGS. 7E and 7F show dividing the basic block 700 into three rectangular sub-blocks at a ratio of 1:2:1. As described above, encoding processing is performed using not only square sub-blocks but also rectangular sub-blocks.

In this embodiment, only the method (FIG. 7A) in which the basic block of 8×8 pixels is not divided is used, as described above. However, the sub-block dividing method is not limited to this. Quadtree division as shown in FIG. 7B, ternary tree division as shown in FIG. 7E or 7F, or binary tree division as shown in FIG. 7C or 7D may be used. If sub-block division other than that shown in FIG. 7A is used, the quantization matrix holding unit 103 generates a quantization matrix corresponding to the sub-block to be used. The generated quantization matrix is encoded by the quantization matrix encoding unit 113.

A prediction method used in this embodiment will be described anew. In this embodiments, three types of prediction methods, that is, intra-prediction, inter-prediction, and weighted intra-/inter-prediction are used. In intra-prediction, using encoded pixels spatially located around an encoding target block, predicted pixels of the encoding target block are generated, and an intra-prediction mode representing an intra-prediction method such as horizontal prediction, vertical prediction, or DC prediction is also generated. In inter-prediction, using encoded pixels of a frame temporally different from the encoding target block, predicted pixels of the encoding target block are generated, and motion information representing a frame to be referred to, a motion vector, and the like is also generated.

In weighted intra-/inter-prediction, predicted pixels of the encoding target block are generated by obtaining the weighted average of the pixel values generated by the above-described intra-prediction and the pixel values generated by the above-described inter-prediction. For example, calculation is performed using $$p[x][y]=\{w \times pinter[x][y]+(8-w) \times pintra[x][y]\} >> 3 \qquad (1)$$

(">>" represents a bit shift to the right).

In equation (1), p[x][y] is a predicted pixel by weighted intra-/inter-prediction for coordinates (x, y) in a block of interest as an encoding target. Also, pinter[x][y] represents a pixel value in an inter-prediction image for the coordinates (x, y) in the block of interest. In addition, pintra[x][y] represents a pixel value in an intra-prediction image for the coordinates (x, y) in the block of interest. w represents a weight value for the pixel values of inter-prediction and the pixel values of intra-prediction. In this embodiment, when w=4, weights for the pixel values of inter-prediction and the pixel values of intra-prediction become equal. In other words, if w>4, the weight for the pixel values of inter-prediction increases. If w<4, the weight for the pixel values of intra-prediction increases. In weighted intra-/inter-prediction, the predicted pixels of the encoding target block are generated in this way, and the intra-prediction mode and motion information used to generate the predicted pixels are also generated.

The prediction unit 104 generates predicted image data of the encoding target sub-block from the decided prediction mode and encoded pixels. Then, the prediction unit 104 generates prediction error data by calculating the difference between the image data of the encoding target sub-block and the generated predicted image data, and supplies the generated prediction error data to the transforming/quantizing unit 105. The prediction unit 104 also supplies prediction information such as sub-block division, a prediction mode (information representing which one of intra-prediction, inter-prediction, and weighted intra-/inter-prediction is used), and vector data to the encoding unit 110 and the image regenerating unit 107.

The transforming/quantizing unit 105 performs orthogonal transform/quantization for the input prediction error data, thereby generating quantized coefficients. More specifically, the transforming/quantizing unit 105 executes orthogonal transform processing corresponding to the size of the prediction error data, thereby generating orthogonal transform coefficients. Next, the transforming/quantizing unit 105 selects a quantization matrix stored in the quantization matrix holding unit 103 in accordance with the prediction mode and quantizes the orthogonal transform coefficients using the selected quantization matrix, thereby generating quantized coefficients. In this embodiment, the quantization matrix 800 shown in FIG. 8A is used for a sub-block that has undergone prediction processing by intra-prediction. Also, the quantization matrix 801 shown in FIG. 8B is used for a sub-block that has undergone inter-prediction. The quantization matrix 802 shown in FIG. 8C is used for a sub-block that has undergone weighted intra-/inter-prediction. However, the quantization matrices to be used are not limited to these. Then, the transforming/quantizing unit 105 supplies the generated quantized coefficients to the encoding unit 110 and the inverse quantizing/inverse transforming unit 106.

The inverse quantizing/inverse transforming unit 106 inversely quantizes the input quantized coefficients of the sub-block using the quantization matrix stored in the quantization matrix holding unit 103, thereby regenerating transform coefficients. The inverse quantizing/inverse transforming unit 106 also performs inverse orthogonal transform of the regenerated transform coefficients, thereby regenerating the prediction error data. For the inverse quantization processing, a quantization matrix corresponding to the prediction mode of the encoding target block is used, as in the transforming/quantizing unit 105. More specifically, the same quantization matrix as that used by the transforming/quantizing unit 105 is used. The inverse quantizing/inverse transforming unit 106 then supplies the regenerated prediction error data to the image regenerating unit 107.

The image regenerating unit 107 appropriately refers to the frame memory 108 based on the prediction information input from the prediction unit 104, thereby regenerating predicted image data. The image regenerating unit 107 then regenerates the image data of the sub-block by adding the regenerated predicted image and the prediction error data input from the inverse quantizing/inverse transforming unit 106, and stores the image data in the frame memory 108.

The in-loop filtering unit 109 reads out the regenerated image data from the frame memory 108, and performs in-loop filtering processing such as deblocking filtering. The in-loop filtering unit 109 then stores the image data that has undergone the filtering processing in the frame memory 108 again.

The encoding unit 110 entropy-encodes the quantized coefficients generated by the transforming/quantizing unit 105 and the prediction information input from the prediction unit 104 on a sub-block basis, thereby generating encoded data. The method of entropy encoding is not particularly limited, and Golomb coding, arithmetic coding, Huffman coding, or the like can be used. The generated encoded data is supplied to the combined encoding unit 111.

The combined encoding unit 111 forms a bitstream by multiplexing encoded data input from the encoding unit 110, and the like together with the above-described encoded data of the header. Finally, the bitstream is output from the output terminal 112 to the outside.

FIG. 6A shows an example of the data structure of a bitstream output in the first embodiment. A sequence header includes the encoded data of a quantization matrix, which is formed by the encoded data of each element. However, the position to encode is not limited to this, and the data may be encoded in a picture header portion or another header portion. If the quantization matrix is to be changed in one sequence, the quantization matrix can be updated by newly encoding it. At this time, all quantization matrices may be rewritten, or some of them may be changed by designating the prediction mode of a quantization matrix corresponding to a quantization matrix to be rewritten.

Figure 3:
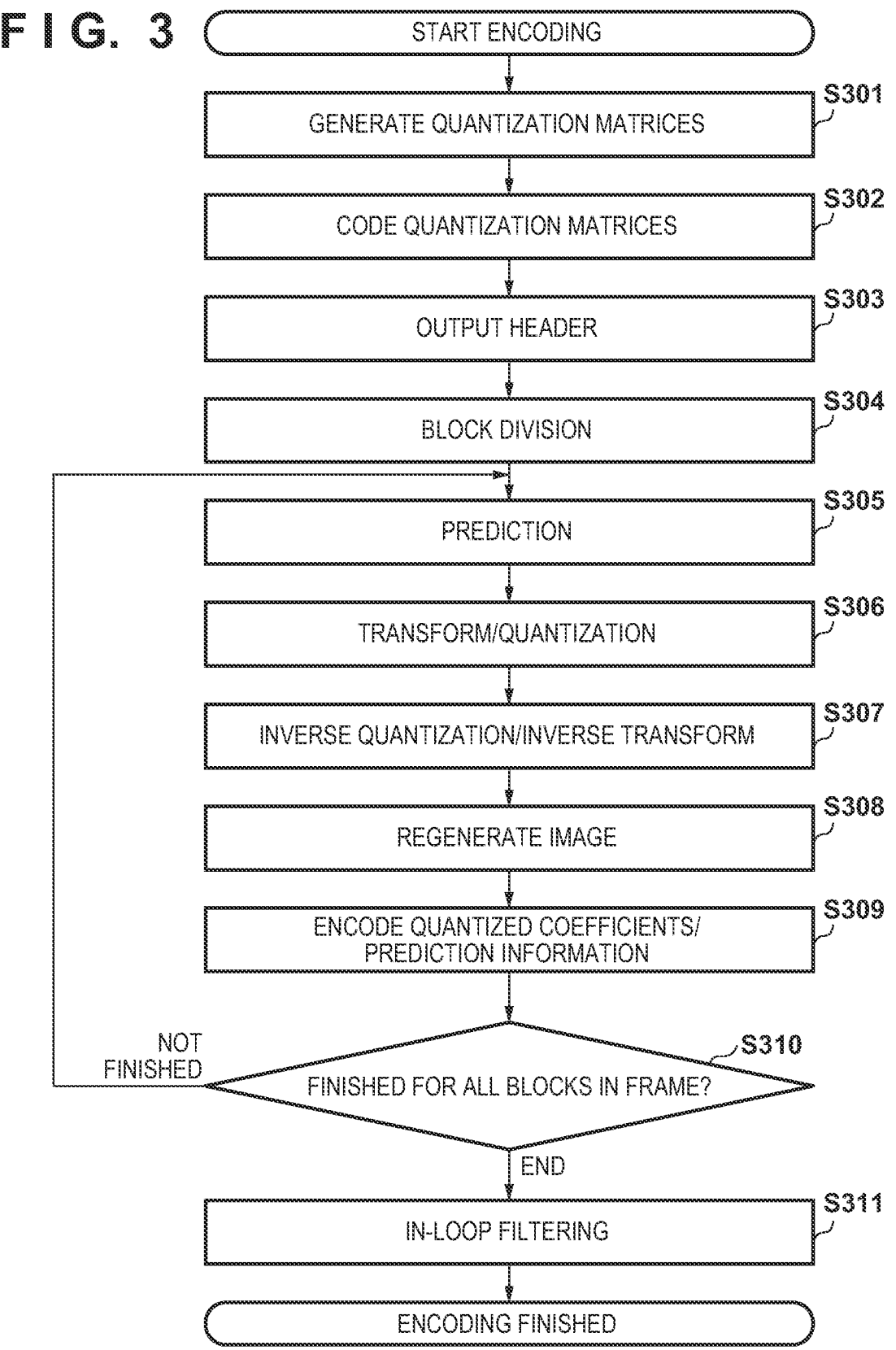
FIG. 3 is a flowchart showing image encoding processing of the image encoding apparatus according to the first embodiment.

The processing procedure of encoding processing of one frame by the image encoding apparatus according to the first embodiment will be described below with reference to the flowchart of FIG. 3. Note that the processing of each step in the following description is executed by its main subject under the control of the control unit 150.

First, prior to encoding of an image, in step S301, the quantization matrix holding unit 103 generates two-dimensional quantization matrices and holds them. The quantization matrix holding unit 103 according to this embodiment generates the quantization matrices 800 to 802 corresponding to the sub-blocks of 8×8 pixels shown in FIGS. 8A to 8C and corresponding to prediction methods including intra-prediction, inter-prediction, and weighted intra-/inter-prediction, and holds these.

In step S302, the quantization matrix encoding unit 113 scans the quantization matrices 800 to 802 generated and held in step S301 to calculate the differences between the elements and generates one-dimensional difference matrices. The quantization matrix encoding unit 113 according to this embodiment generates the difference matrices 1000 to 1002 shown in FIGS. 10A to 10C using the scanning method shown in FIG. 9 from the quantization matrices 800 to 802 shown in FIGS. 8A to 8C. The quantization matrix encoding unit 113 also generates binary codes from the generated difference matrices 1000 to 1002 by referring to the encoding table shown in FIG. 11A (or FIG. 11B), thereby generating encoded data.

In step S303, the combined encoding unit 111 generates header information necessary for encoding of the image data together with the generated encoded data of the quantization matrices 800 to 802 and outputs the header information.

In step S304, the block dividing unit 102 divides an input image of each frame into basic blocks. In step S305, the prediction unit 104 divides the image data of each basic block generated in step S304 into one or more sub-blocks, executes prediction processing for each sub-block, and generates predicted image data and prediction information such as sub-block division information and a prediction mode. In this embodiment, three types of prediction methods, that is, intra-prediction, inter-prediction, and weighted intra-/inter-prediction are used. Also, the prediction unit 104 calculates prediction error data that is the difference between the input image data and the predicted image data.

Note that a detailed example of processing by the prediction unit 104 is as follows. The prediction unit 104 performs intra-prediction processing for the image data of a sub-block of interest to be encoded by referring to an encoded region of the same frame to which the sub-block of interest belongs, thereby generating intra-prediction image data Pintra[x][y]. Also, the prediction unit 104 performs inter-prediction processing by referring to an already encoded frame (for example, an immediately preceding frame) different from the frame to which the sub-block of interest to be encoded belongs, thereby generating inter-prediction image data Pinter[x][y]. Weighted intra-/inter-prediction image data P[x][y] is then generated based on equation (1) described above. The prediction unit 104 obtains the square sums (or the absolute value sums) of the three predicted image data and the difference data between the pixel values of the sub-block of interest, and decides the prediction mode of the predicted image data for which the square sum is minimum as the prediction mode of the sub-block of interest. In this embodiment, the weight value w is uniquely calculated in accordance with the intra-prediction mode, the size of a motion vector, the position of the sub-block of interest, and the like. However, the calculation method of the weight value w is not limited to this. For example, the prediction unit 104 sets w=0, 1, . . . , 8 and obtains nine predicted image data in these cases. The prediction unit 104 may obtain the square sums (or the absolute value sums) of the nine predicted image data and the difference data between the pixel values of the sub-block of interest, and may determine "w" for which the square sum is minimum. In this case, if w=0, the prediction unit 104 decides, from equation (1), that the sub-block of interest should be encoded by intra-prediction encoding. If w=8, the prediction unit 104 decides, from equation (1), that the sub-block of interest should be encoded by inter-prediction encoding. If w ranges from 1 to 7, the prediction unit 104 decides that the sub-block of interest should be encoded by weighted intra-/inter-prediction encoding. In this case, the decided value w may also be encoded in step S309 of the subsequent stage.

In step S306, the transforming/quantizing unit 105 performs orthogonal transform of the prediction error data calculated in step S305, thereby generating transform coefficients. Also, the transforming/quantizing unit 105 selects, based on the prediction information, one of the quantization matrices generated an held in step S301, and performs quantization using the selected quantization matrix, thereby generating quantized coefficients. In this embodiment, the quantization matrix 800 shown in FIG. 8A is used for a sub-block for which intra-prediction is used, the quantization matrix 801 shown in FIG. 8B is used for a sub-block for which inter-prediction is used, and the quantization matrix 802 shown in FIG. 8C is used for a sub-block for which weighted intra-/inter-prediction is used.

In step S307, the inverse quantizing/inverse transforming unit 106 inversely quantizes the quantized coefficients generated in step S305 using the quantization matrix generated and held in step S301, thereby regenerating the transform coefficients. The inverse quantizing/inverse transforming unit 106 also performs inverse orthogonal transform of the transform coefficients, thereby regenerating the prediction error data. In this step, the inverse quantization processing is performed using the same quantization matrix as that used in step S306.

In step S308, the image regenerating unit 107 regenerates the predicted image data based on the prediction information generated in step S305. The image regenerating unit 107 also regenerates the image data of the sub-block from the regenerated predicted image data and the prediction error data generated in step S307.

In step S309, the encoding unit 110 encodes the prediction information generated in step S305 and the quantized coefficients generated in step S306, thereby generating encoded data. The encoding unit 110 also generates a bitstream including other encoded data.

In step S310, the control unit 150 determines whether encoding of all basic blocks in the frame is ended. If encoding is ended, the process advances to step S311. Otherwise, the process returns to step S305 to perform encoding of the next basic block as the target.

In step S311, the in-loop filtering unit 109 performs in-loop filtering processing for the image data regenerated in step S308 to generate the image that has undergone the filtering processing, and the processing is ended.

In the above-described processing, to encode the second and subsequent frames of the moving image, steps S304 to S311 are repeated until the final frame to be encoded is input.

With the above-described configuration and operation, particularly in step S306, or a sub-block using weighted intra-/inter-prediction, quantization processing using a quantization matrix dedicated to that is performed. This makes it possible to control quantization for each frequency component and improve subjective image quality.

Note that in this embodiment, quantization matrices are individually defined for the three types of prediction methods including intra-prediction, inter-prediction, and weighted intra-/inter-prediction, and all the three types of quantization matrices are encoded. However, some of these may be shared.

For example, the sub-block using weighted intra-/inter-prediction may be quantized using the quantization matrix 800 shown in FIG. 8A, like the sub-block using intra-prediction, and encoding of the quantization matrix 802 shown in FIG. 8C may be omitted. This can reduce image quality degradation that occurs due to an error such as a block distortion caused by intra-prediction while decreasing the code amount corresponding to the quantization matrix 802 shown in FIG. 8C.

Similarly, the sub-block using weighted intra-/inter-prediction may be quantized using the quantization matrix 801 shown in FIG. 8B, like the sub-block using inter-prediction, and encoding of the quantization matrix 802 shown in FIG. 8C may be omitted. This can reduce image quality degradation that occurs due to an error such as an unsmooth motion caused by inter-prediction while decreasing the code amount corresponding to the quantization matrix shown in FIG. 8C.

Alternatively, in equation (1) described above, a quantization matrix to be used for the sub-block using weighted intra-/inter-prediction may adaptively be decided in accordance with the value of the weight value w representing the weight of an intra-prediction pixel value and an inter-prediction pixel value. For example, if the value of the weight value w for a minimum difference is a predetermined value (for example, a center value of 4) or more, the quantization matrix 801 shown in FIG. 8B may be used for the sub-block using weighted intra-/inter-prediction, and if the value is smaller, the quantization matrix 800 shown in FIG. 8A may be used. This makes it possible to decrease the code amount corresponding to the quantization matrix shown in FIG. 8C, whose encoding is omitted while reducing image quality degradation for the prediction method with the larger weight. Alternatively, a quantization matrix to be used for the sub-block using weighted intra-/inter-prediction may newly be generated in accordance with the value of the weight value w. For example, calculation can be performed using $$QM[x][y] = \{w \times QMinter[x][y] + (8-w) \times QMintra[x][y]\} >> 3 \quad (2)$$

In equation (2) above, QM[x][y] is an element (quantization step value) at coordinates (x, y) of the calculated quantization matrix used for the sub-block using weighted intra-/inter-prediction. QMinter[x][y] is an element at the coordinates (x, y) of the quantization matrix used for the sub-block for inter-prediction. Similarly, QMintra[x][y] is an element at the coordinates (x, y) of the quantization matrix for intra-prediction. This makes it possible to perform appropriate quantization control according to the weight value w and improve subjective image quality while decreasing the code amount corresponding to the quantization matrix 802 shown in FIG. 8C, whose encoding is omitted.

Also, in this embodiment, the quantization matrix for the sub-block using weighted intra-/inter-prediction is uniquely determined. However, the quantization matrix may be made selectable by introducing an identifier. For example, in FIG. 6B, quantization matrix encoding for the sub-block using weighted intra-/inter-prediction is made selectable by newly introducing a quantization matrix encoding method information code. For example, if the quantization matrix encoding method information code indicates 0, the quantization matrix 800 (FIG. 8A) for the sub-block using intra-prediction is used for the sub-block using weighted intra-/inter-prediction. If the quantization matrix encoding method information code indicates 1, the quantization matrix 801 (FIG. 8B) for the sub-block using inter-prediction is used for the sub-block using weighted intra-/inter-prediction. On the other hand, if the quantization matrix encoding method information code indicates 2, the individually encoded quantization matrix 802 (FIG. 8C) is used for the sub-block using weighted intra-/inter-prediction. It is therefore possible to selectively implement quantization matrix code amount reduction and unique quantization control for the sub-block using weighted intra-/inter-prediction.

Second Embodiment

Figure 2:
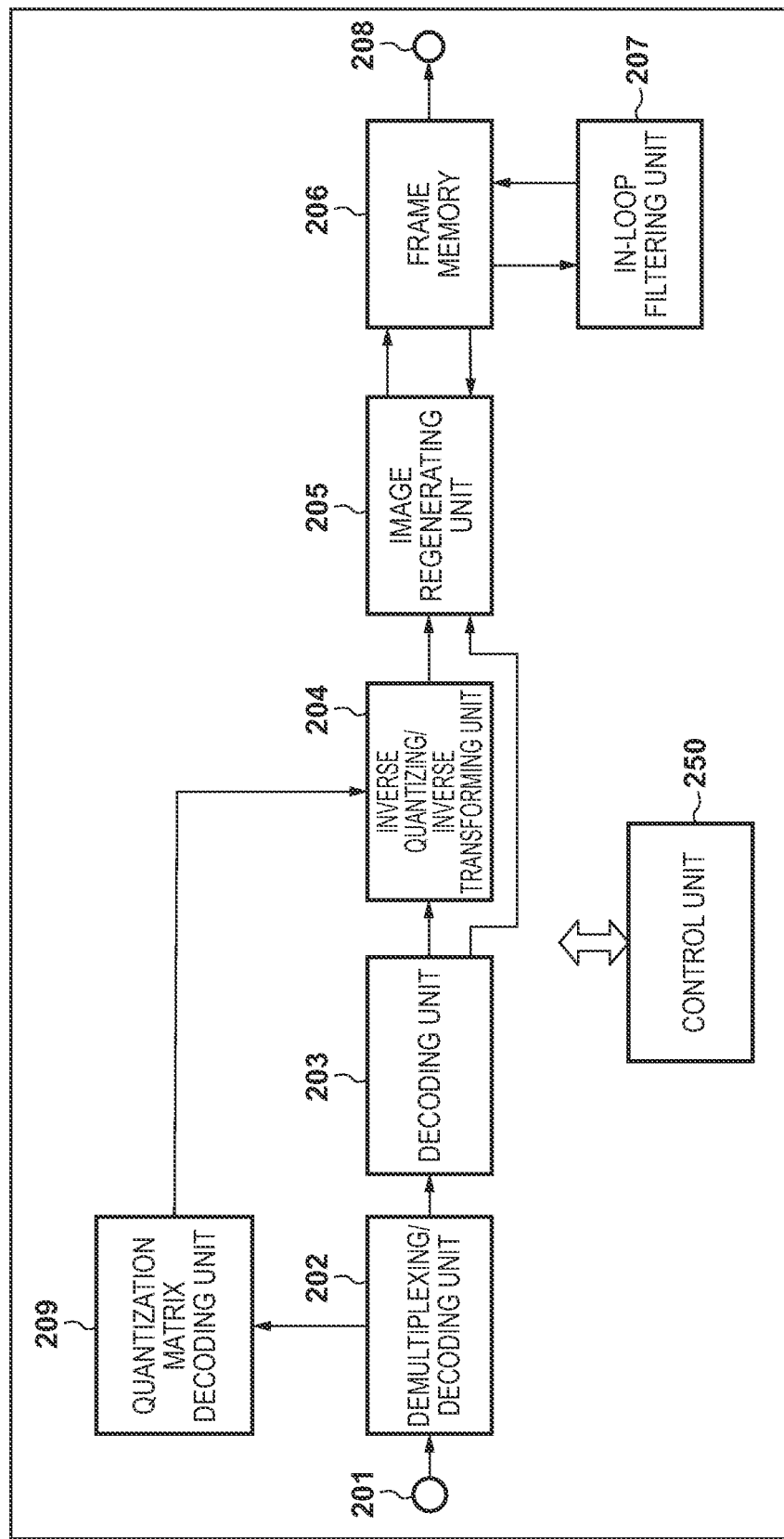
FIG. 2 is a block diagram showing the configuration of an image decoding apparatus according to the second embodiment.

In the second embodiment, an image decoding apparatus for decoding encoded data generated by the image encoding apparatus according to the first embodiment will be described. FIG. 2 is a block diagram showing the configuration of the image decoding apparatus.

The image decoding apparatus includes a control unit 250 configured to control constituent elements to be described below and perform control of the entire apparatus. The control unit 250 includes a CPU, a ROM that stores programs to be executed by the CPU, various kinds of parameters, and the like, and a RAM used as the work area of the CPU. Note that an OS (Operating System), programs, and parameters stored in the ROM or another nonvolatile storage device may be loaded into the RAM, and after that, the programs may be executed under the control of the OS.

In addition, the image decoding apparatus includes an input terminal 201, a demultiplexing/decoding unit 202, a decoding unit 203, an inverse quantizing/inverse transforming unit 204, an image regenerating unit 205, a frame memory 206, an in-loop filtering unit 207, an output terminal 208, and a quantization matrix decoding unit 209.

The configuration and operation of the image decoding apparatus in the configuration of the above-described image decoding apparatus will be described below. Note that the image decoding apparatus is configured to input, on a frame basis, a bitstream generated by the above-described image encoding apparatus.

The demultiplexing/decoding unit 202 inputs an encoded bitstream via the input terminal 201, demultiplexes information concerning decoding processing and encoded data concerning coefficients from the bitstream, and decodes encoded data existing in the header portion of the bitstream. The demultiplexing/decoding unit 202 according to this embodiment demultiplexes the encoded data of a quantization matrix from the encoded bitstream, and supplies the encoded data to the quantization matrix decoding unit 209. The demultiplexing/decoding unit 202 also demultiplexes the encoded data of image data from the encoded bitstream, and supplies the encoded data to the decoding unit 203. In short, the demultiplexing/decoding unit 202 performs an operation reverse to that of the combined encoding unit 111 shown in FIG. 1.

The quantization matrix decoding unit 209 decodes the encoded data of the quantization matrix from the demultiplexing/decoding unit 202 and regenerates and holds quantization matrices 800 to 802.

The decoding unit 203 decodes the encoded data input from the demultiplexing/decoding unit 202 and regenerates quantized coefficients and prediction information.

Like the inverse quantizing/inverse transforming unit 106 shown in FIG. 1, the inverse quantizing/inverse transforming unit 204 inversely quantizes the quantized coefficients using the regenerated quantization matrices 800 to 802, thereby obtaining transform coefficients. The inverse quantizing/inverse transforming unit 204 also performs inverse orthogonal transform, thereby regenerating prediction error data.

The image regenerating unit 205 appropriately refers to the frame memory 206 based on the input prediction information, thereby generating predicted image data. The image regenerating unit 205 generates image data by adding the prediction error data regenerated by the inverse quantizing/inverse transforming unit 204 to the predicted image data, and stores the image data in the frame memory 206.

The in-loop filtering unit 207 performs in-loop filtering processing such as deblocking filtering for the regenerated image stored in the frame memory 206, and stores the image data that has undergone the filtering processing in the frame memory 206 again, like the in-loop filtering unit 109 shown in FIG. 1. Then, the output terminal 208 outputs the regenerated image data to an external apparatus (for example, a display apparatus).

The operation of each constituent element of the image decoding apparatus shown in FIG. 2 will be described next in more detail.

In the second embodiment, a bitstream generated in the first embodiment is input on a frame basis.

The bitstream of one frame input via the input terminal 201 is supplied to the demultiplexing/decoding unit 202. The demultiplexing/decoding unit 202 demultiplexes information concerning decoding processing and encoded data concerning coefficients from the bitstream, and decodes encoded data existing in the header portion of the bitstream. More specifically, the demultiplexing/decoding unit 202 regenerates the encoded data of a quantization matrix. The demultiplexing/decoding unit 202 according to this embodiment first extracts the encoded data of quantization matrices 800 to 802 shown in FIGS. 8A to 8C from the sequence header of the bitstream shown in FIG. 6A, and supplies the encoded data to the quantization matrix decoding unit 209. Next, the demultiplexing/decoding unit 202 regenerates the encoded data of each sub-block of a basic block of picture data, and supplies the encoded data to the decoding unit 203.

First, the quantization matrix decoding unit 209 decodes the input quantization matrix encoded data, thereby regenerating one-dimensional difference matrices 1000 to 1002 shown in FIGS. 10A to 10C. In this embodiment, decoding is performed using the encoding table shown in FIG. 11A (or FIG. 11B), as in the first embodiment. However, the encoding table is not limited to this, and any other encoding table may be used as far as the same encoding table as in the first embodiment is used. Also, the quantization matrix decoding unit 209 inversely scans the regenerated one-dimensional difference matrices, thereby regenerating two-dimensional quantization matrices. Here, an operation reverse to that of the quantization matrix encoding unit 113 according to the first embodiment is performed. That is, the quantization matrix decoding unit 209 according to this embodiment regenerates the three types of quantization matrices 800 to 802 shown in FIGS. 8A to 8C from the difference matrices 1000 to 1002 shown in FIGS. 10A to 10C using the scanning method shown in FIG. 9, and holds these.

The decoding unit 203 decodes the encoded data, thereby regenerating quantized coefficients and prediction information. The decoding unit 203 then supplies the regenerated quantized coefficients to the inverse quantizing/inverse transforming unit 204, and supplies the regenerated prediction information to the image regenerating unit 205.

The inverse quantizing/inverse transforming unit 204 selects one of the quantization matrices 800 to 802 regenerated by the quantization matrix decoding unit 209. The inverse quantizing/inverse transforming unit 204 then inversely quantizes the input quantized coefficients using the selected quantization matrix, thereby generating orthogonal transform coefficients. The inverse quantizing/inverse transforming unit 204 further executes inverse orthogonal transform to regenerate prediction error data and supplies the regenerated prediction information to the image regenerating unit 205. In accordance with the prediction mode of a decoding target block determined in accordance with the prediction information regenerated by the decoding unit 203, the inverse quantizing/inverse transforming unit 204 according to this embodiment decides the quantization matrix to be used in inverse quantization processing. That is, the quantization matrix 800 shown in FIG. 8A is selected for a sub-block for which intra-prediction is used, the quantization matrix 801 shown in FIG. 8B is selected for a sub-block for which inter-prediction is used, and the quantization matrix 802 shown in FIG. 8C is selected for a sub-block for which weighted intra-/inter-prediction is used. However, the quantization matrices to be used are not limited to these, and the same quantization matrices as those used by the transforming/quantizing unit 105 and the inverse quantizing/inverse transforming unit 106 according to the first embodiment can be used.

The image regenerating unit 205 appropriately refers to the frame memory 206 based on the prediction information input from the decoding unit 203, thereby regenerating predicted image data. In this embodiment, three types of prediction methods, that is, intra-prediction, inter-prediction, and weighted intra-/inter-prediction are used, as in the prediction unit 104 according to the first embodiment. Detailed prediction processing is the same as that of the prediction unit 104 according to the first embodiment, and a description thereof will be omitted. The image regenerating unit 205 regenerates image data by adding the prediction error data input from the inverse quantizing/inverse transforming unit 204 to the predicted image data, and stores the image data in the frame memory 206. The stored image data is a prediction referring candidate when decoding another sub-block.

The in-loop filtering unit 207 reads out the regenerated image data from the frame memory 206, and performs in-loop filtering processing such as deblocking filtering, like the in-loop filtering unit 109 shown in FIG. 1. The in-loop filtering unit 207 then stores the image data that has undergone the filtering processing in the frame memory 206 again.

The regenerated image stored in the frame memory 206 is finally output from the output terminal 208 to the outside.

Figure 4:
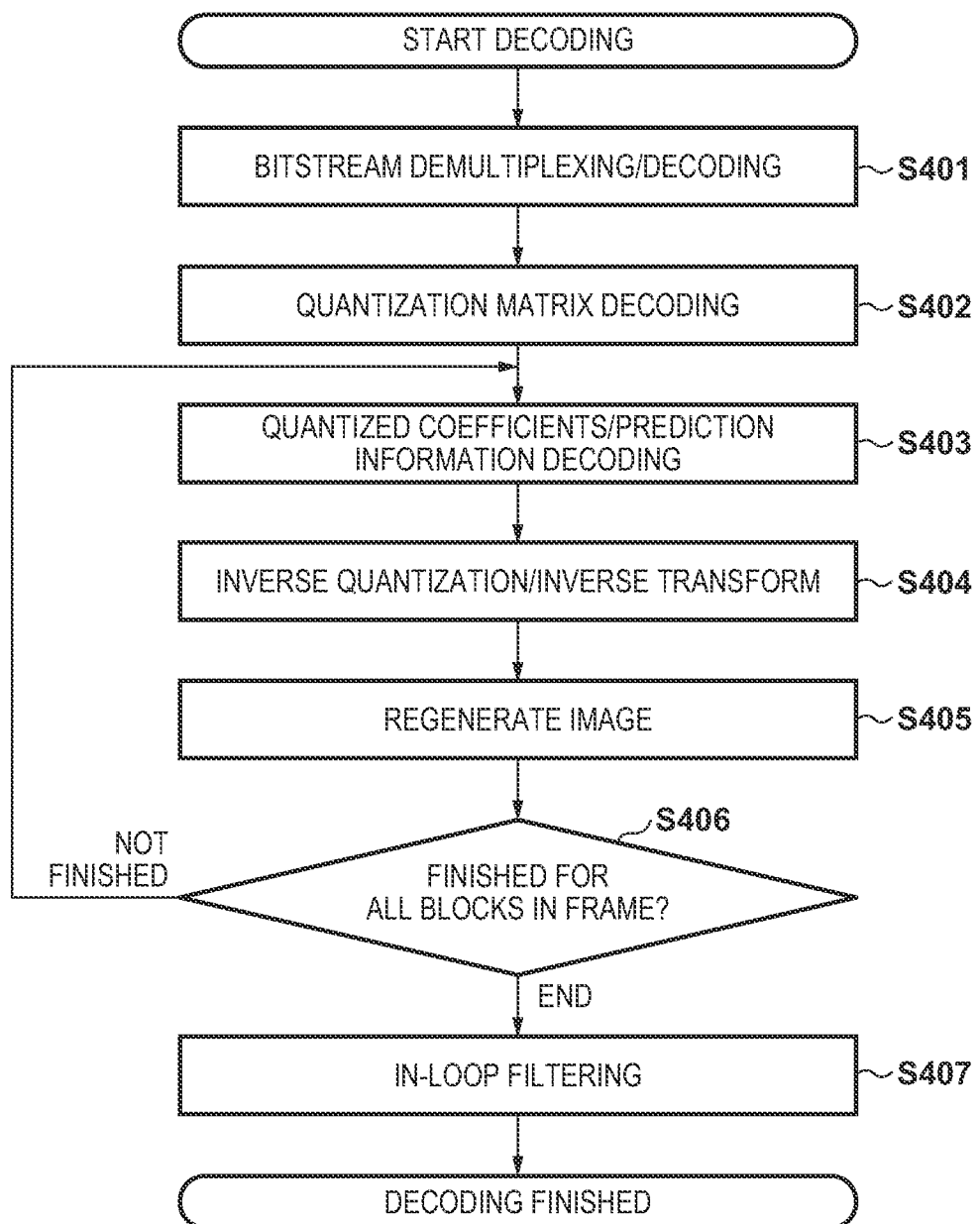
FIG. 4 is a flowchart showing image decoding processing of the image decoding apparatus according to the second embodiment.

The processing procedure of decoding processing of one frame by the image decoding apparatus according to the second embodiment will be described below with reference to the flowchart of FIG. 4. Note that the processing of each step in the following description is executed by its main subject under the control of the control unit 250.

First, in step S401, the demultiplexing/decoding unit 202 demultiplexes information concerning decoding processing and encoded data concerning coefficients from the bitstream, and decodes encoded data in the header portion. More specifically, the encoded data of a quantization matrix is regenerated.

In step S402, the quantization matrix decoding unit 209 decodes the encoded data of the quantization matrix regenerated in step S401, thereby regenerating the one-dimensional difference matrices 1000 to 1002 shown in FIGS. 10A to 10C. Also, the quantization matrix decoding unit 209 inversely scans the regenerated one-dimensional difference matrices 1000 to 1002, thereby regenerating and holding the two-dimensional quantization matrices 800 to 802.

That is, in this embodiment, the quantization matrix decoding unit 209 regenerates the three types of quantization matrices 800 to 802 shown in FIGS. 8A to 8C from the difference matrices 1000 to 1002 shown in FIGS. 10A to 10C using the scanning method shown in FIG. 9, and holds these.

In step S403, the decoding unit 203 decodes the encoded data demultiplexed in step S401, thereby regenerating quantized coefficients and prediction information.

In step S404, the inverse quantizing/inverse transforming unit 204 obtains transform coefficients by inversely quantizing the quantized coefficients using one of the quantization matrices 800 to 802 regenerated in step S402. The inverse quantizing/inverse transforming unit 204 further performs inverse orthogonal transform to regenerate prediction error data. The inverse quantizing/inverse transforming unit 204 according to this embodiment decides the quantization matrix to be used in accordance with the prediction mode determined based on the prediction information regenerated in step S403. That is, the quantization matrix 800 shown in FIG. 8A is used for a sub-block for which intra-prediction is used. Also, the quantization matrix 801 shown in FIG. 8B is used for a sub-block for which inter-prediction is used. The quantization matrix 802 shown in FIG. 8C is used for a sub-block for which weighted intra-/inter-prediction is used. However, the quantization matrices to be used are not limited to these, and the same quantization matrices as those used in steps S306 and S307 of the first embodiment can be used.

In step S405, the image regenerating unit 205 regenerates predicted image data from the prediction information generated in step S403. The image regenerating unit 205 according to this embodiment uses three types of prediction methods, that is, intra-prediction, inter-prediction, and weighted intra-/inter-prediction, as in step S305 of the first embodiment. The image regenerating unit 205 also regenerates image data by adding the prediction error data generated in step S404 to the regenerated predicted image data.

In step S406, the control unit 250 determines whether decoding of all basic blocks in the frame is ended. If decoding is ended, the process advances to step S407. Otherwise, the process returns to step S403 to set the next basic block to the decoding target.

In step S407, the in-loop filtering unit 207 performs in-loop filtering processing for the image data regenerated in step S405 to generate the image that has undergone the filtering processing, and the processing is ended.

With the above-described configuration and operation, even for the sub-block using weighted intra-/inter-prediction, which is generated in the first embodiment, it is possible to control quantization for each frequency component and decode a bitstream with improved subjective image quality.

Note that in this embodiment, quantization matrices are individually defined for the three types of prediction methods including intra-prediction, inter-prediction, and weighted intra-/inter-prediction, and all the three types of quantization matrices are decoded. However, some of these may be shared.

For example, the sub-block using weighted intra-/inter-prediction may be inversely quantized using the quantization matrix 800 shown in FIG. 8A, like the sub-block using intra-prediction, and decoding of the quantization matrix 802 shown in FIG. 8C may be omitted. This makes it possible to decode a bitstream in which image quality degradation that occurs due to an error such as a block distortion caused by intra-prediction is reduced while decreasing the code amount corresponding to the quantization matrix shown in FIG. 8C.

Similarly, the sub-block using weighted intra-/inter-prediction may be inversely quantized using the quantization matrix 801 shown in FIG. 8B, like the sub-block using inter-prediction, and decoding of the quantization matrix shown in FIG. 8C may be omitted. This makes it possible to decode a bitstream in which image quality degradation that occurs due to an error such as an unsmooth motion caused by inter-prediction is reduced while decreasing the code amount corresponding to the quantization matrix 802 shown in FIG. 8C.

Alternatively, in equation (1) described above, a quantization matrix to be used for the sub-block using weighted intra-/inter-prediction may adaptively be decided in accordance with the value of a weight value w representing the weight of an intra-prediction pixel value and an inter-prediction pixel value. For example, if the value w is a predetermined value (for example, a center value of 4) or more, FIG. 8(*b*) may be used for the sub-block using weighted intra-/inter-prediction, and if the value is smaller, the quantization matrix 800 shown in FIG. 8A may be used. This makes it possible to decode a bitstream in which the code amount corresponding to the quantization matrix 802 shown in FIG. 8C, whose encoding is omitted, is decreased while reducing image quality degradation for the prediction method with the larger weight. Alternatively, a quantization matrix to be used for the sub-block using weighted intra-/inter-prediction may newly be generated in accordance with the value of the weight value w, as in equation (2) described above. This makes it possible to perform appropriate quantization control according to the weight value w and decode a bitstream in which subjective image quality is improved while decreasing the code amount corresponding to the quantization matrix 802 shown in FIG. 8C, whose encoding is omitted.

Also, in this embodiment, the quantization matrix for the sub-block using weighted intra-/inter-prediction is uniquely determined. However, the quantization matrix may be made selectable by introducing an identifier. For example, in FIG. 6B, quantization matrix encoding for the sub-block using weighted intra-/inter-prediction is made selectable by newly introducing a quantization matrix encoding method information code. For example, if the quantization matrix encoding method information code indicates 0, the quantization matrix 800 (FIG. 8A) for the sub-block using intra-prediction is used for the sub-block using weighted intra-/inter-prediction. If the quantization matrix encoding method information code indicates 1, the quantization matrix 801 (FIG. 8B) for the sub-block using inter-prediction is used for the sub-block using weighted intra-/inter-prediction. On the other hand, if the quantization matrix encoding method information code indicates 2, the individually encoded quantization matrix 802 (FIG. 8C) is used for the sub-block using weighted intra-/inter-prediction. It is therefore possible to decode a bitstream that selectively implements quantization matrix code amount reduction and unique quantization control for the sub-block using weighted intra-/inter-prediction.

Third Embodiment

In the above-described embodiments, the description has been made assuming that the processing units shown in FIGS. 1 and 2 are formed by hardware. However, processing performed by the processing units shown in FIGS. 1 and 2 may be configured by a computer program.

Figure 5:
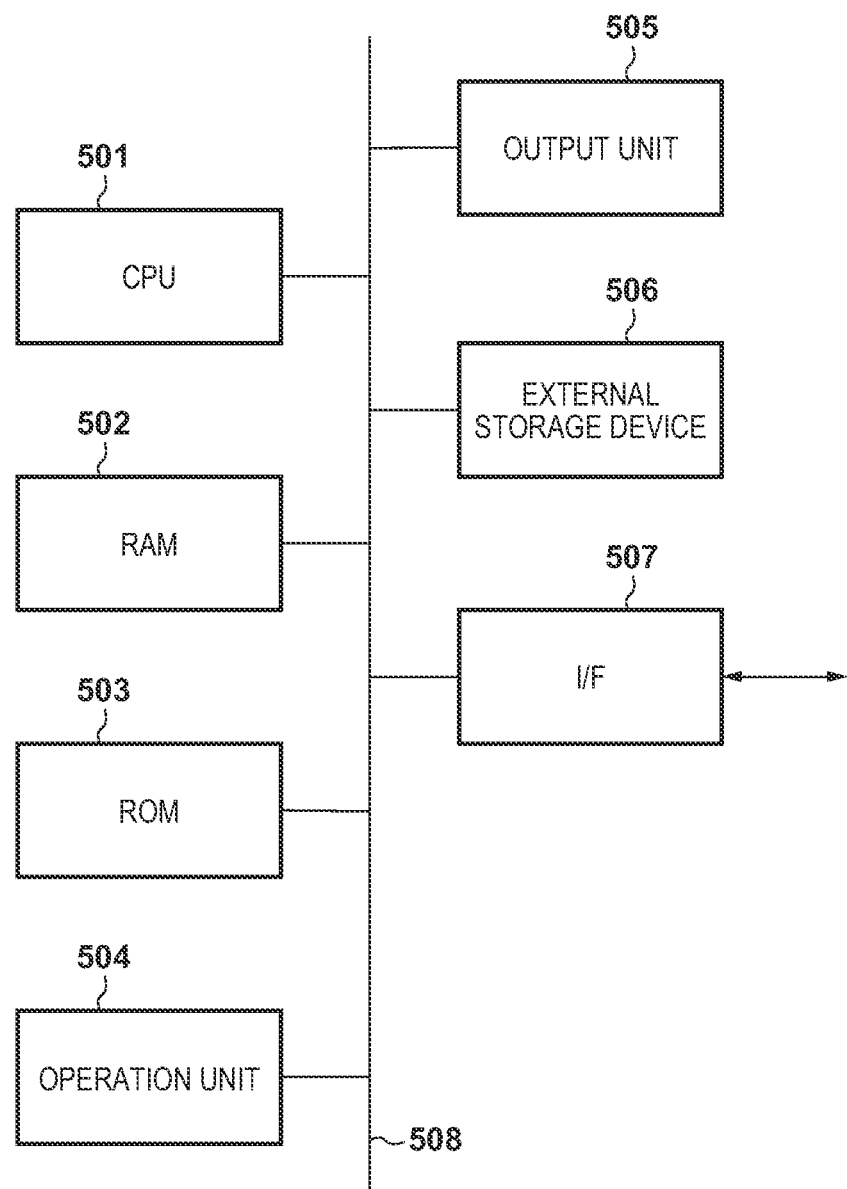
FIG. 5 is a block diagram showing an example of the hardware configuration of a computer applicable as an image encoding apparatus or a decoding apparatus.

FIG. 5 is a block diagram showing an example of the hardware configuration of a computer applicable as an image display apparatus according to the above-described embodiments.

A CPU 501 controls the entire computer using computer programs and data stored in a RAM 502 or a ROM 503, and executes processing described above as processing to be performed by the image processing apparatus according to the above-described embodiments. That is, the CPU 501 functions as the processing units shown in FIGS. 1 and 2.

The RAM 502 has an area for temporarily storing computer programs and data loaded from an external storage device 506 and data acquired from the outside via an OF (interface) 507. The RAM 502 also has a work area used by the CPU 501 to execute various kinds of processing. That is, the RAM 502 can be, for example, allocated as a frame memory or can appropriately provide various kinds of other areas.

The ROM 503 stores setting data of the computer, a boot program, and the like. An operation unit 504 is formed by a keyboard, a mouse, or the like. By operating the operation unit 504, a user of the computer can input various kinds of instructions to the CPU 501. A display unit 505 displays a result of processing by the CPU 501. The display unit 505 is formed by, for example, a liquid crystal display.

The external storage device 506 is a mass information storage device represented by a hard disk drive. An OS (Operating System) and computer programs configured to cause the CPU 501 to implement the functions of the units shown in FIGS. 1 and 2 are stored in the external storage device 506. Image data as a processing target may also be stored in the external storage device 506.

The computer programs and data stored in the external storage device 506 are appropriately loaded into the RAM 502 under the control of the CPU 501 and processed by the CPU 501. A network such as a LAN or the Internet or another apparatus such as a projection apparatus or a display apparatus can be connected to the OF 507. The computer can acquire or send various kinds of information via the OF 507. Reference numeral 508 denotes a bus that connects the above-described units.

In the above-described configuration, when the apparatus is powered on, the CPU 501 executes the boot program in the ROM 503, loads the OS stored in the external storage device 506 into the RAM 502, and activates the OS. As a result, the apparatus can perform communication via the interface 507 and functions as an information processing apparatus. When the CPU 501 loads an application (corresponding to FIG. 3) concerning image encoding from the external storage device 506 into the RAM 502 and executes the application under the control of the OS, the CPU 501 functions as various kinds of processing units shown in FIG. 1, and the apparatus functions as an image encoding apparatus. On the other hand, when the CPU 501 loads an application (corresponding to FIG. 4) concerning image decoding from the external storage device 506 into the RAM 502 and executes the application, the CPU 501 functions as various kinds of processing units shown in FIG. 2, and the apparatus functions as an image decoding apparatus.

According to the present invention, it is possible to perform quantization using a quantization matrix even for an error in a new prediction method using both intra-prediction pixels and inter-prediction pixels and improve subjective image quality.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. An image encoding apparatus for encoding an image, comprising:
  a prediction unit configured to generate, for a target block to be encoded, a predicted image, and obtain prediction errors that are a difference between the target block and the predicted image;
  a transform unit configured to frequency-transform the prediction errors obtained by the prediction unit, to derive transform coefficients;
  a quantization unit configured to quantize, using a quantization matrix, transform coefficients obtained by the transform unit; and
  an encoding unit configured to entropy-encode quantized transform coefficients obtained by the quantization unit, wherein the quantization matrix is a first quantization matrix for intra-prediction or a second quantization matrix for inter-prediction, wherein in a case where the prediction unit generates the predicted image for the target block by performing right shift, by a predetermined number, of a result of adding at least (a) a result of a multiplication of a first value and an intra predicted sample value which is obtained by intra-prediction for the target block and (b) a result of a multiplication of a second value and an inter predicted sample value which is obtained by inter-prediction for the target block, the quantization unit uses the second quantization matrix for inter-prediction as the quantization matrix to be used to quantize the transform coefficients, and wherein the first value and the second value are determined from a single weight value.

2. The image encoding apparatus according to claim 1, wherein sum of the first value and the second value is a result of two to the power of the predetermined number.

3. A control method of encoding an image, comprising:
generating, for a target block to be encoded, a predicted image;
obtaining prediction errors that are a difference between the target block and the predicted image;
frequency-transforming the prediction errors to derive transform coefficients;
quantizing, using a quantization matrix, the transform coefficients; and
entropy-encoding quantized transform coefficients obtained in the quantizing,
wherein the quantization matrix is a first quantization matrix for intra-prediction or a second quantization matrix for inter-prediction, and
wherein in a case where the generating generates the predicted image for the target block by performing right shift, by a predetermined number, of a result of adding at least (a) a result of a multiplication of a first value and an intra predicted sample value which is obtained by intra-prediction for the target block and (b) a result of a multiplication of a second value and an inter predicted sample value which is obtained by inter-prediction for the target block, the second quantization matrix for inter-prediction is used as the quantization matrix to be used to quantize the transform coefficients, and
wherein the first value and the second value are determined from a single weight value.

4. An image decoding apparatus for decoding an image, comprising;
a decoding unit configured to decode quantized transform coefficients;
an inverse quantization unit configured to inversely quantize the quantized transform coefficients using a quantization matrix, to derive transform coefficients;
an inverse transforming unit configured to inversely transform the transform coefficients to derive prediction errors; and
a prediction unit configured to generate a predicted image for a target block, and decode the target block using the predicted image and the prediction errors,
wherein the quantization matrix is a first quantization matrix for intra-prediction or a second quantization matrix for inter-prediction,
wherein in a case where the prediction unit generates the predicted image for the target block by performing right shift, by a predetermined number, of a result of adding at least (a) a result of a multiplication of a first value and an intra predicted sample value which is obtained by intra-prediction for the target block and (b) a result of a multiplication of a second value and an inter predicted sample value which is obtained by inter-prediction for the target block, the inverse quantization unit uses the second quantization matrix for inter-prediction as the quantization matrix to be used to inverse-quantize the quantized transform coefficients, and
wherein the first value and the second value are determined from a single weight value.

5. The image decoding apparatus according to claim 4, wherein sum of the first value and the second value is a result of two to the power of the predetermined number.

6. A control method of decoding an image, comprising;
decoding quantized transform coefficients;
inversely quantizing the quantized transform coefficients using a quantization matrix, to derive transform coefficients;
inversely transforming the transform coefficients to derive prediction errors;
generating a predicted image for the target block; and
decoding a target block using the predicted image and the prediction errors,
wherein the quantization matrix is a first quantization matrix for intra-prediction or a second quantization matrix for inter-prediction,
wherein in a case where the generating generates the predicted image for the target block by performing right shift, by a predetermined number, of a result of adding at least (a) a result of a multiplication of a first value and an intra predicted sample value which is obtained by intra-prediction for the target block and (b) a result of a multiplication of a second value and an inter predicted sample value which is obtained by inter-prediction for the target block, the second quantization matrix for inter-prediction is used as the quantization matrix to be used to inverse-quantize the quantized transform coefficients, and
wherein the first value and the second value are determined from a single weight value.

7. A non-transitory computer-readable storage medium storing a program which, when read and executed by a computer, causes the computer to execute the steps of a control method of encoding an image, the method comprising:
generating, for a target block to be encoded, a predicted image;
obtaining prediction errors that are a difference between the target block and the predicted image;
frequency-transforming the prediction errors to derive transform coefficients;
quantizing, using a quantization matrix, the transform coefficients; and
entropy-encoding quantized transform coefficients obtained in the quantizing,
wherein the quantization matrix is a first quantization matrix for intra-prediction or a second quantization matrix for inter-prediction,
wherein in a case where the generating generates the predicted image for the target block by performing right shift, by a predetermined number, of a result of adding at least (a) a result of a multiplication of a first value and an intra predicted sample value which is obtained by intra-prediction for the target block and (b) a result of a multiplication of a second value and an inter predicted sample value which is obtained by inter-prediction for the target block, the second quantization matrix for inter-prediction is used as the quantization matrix to be used to quantize the transform coefficients, and wherein the first value and the second value are determined from a single weight value.

8. A non-transitory computer-readable storage medium storing a program which, when read and executed by a computer, causes the computer to execute the steps of a control method of decoding an image, the method comprising;

decoding quantized transform coefficients;

inversely quantizing the quantized transform coefficients using a quantization matrix, to derive transform coefficients;

inversely transforming the transform coefficients to derive prediction errors;

generating a predicted image for the target block; and decoding a target block using the predicted image and the prediction errors, wherein the quantization matrix is a first quantization matrix for intra-prediction or a second quantization matrix for inter-prediction, wherein in a case where the generating generates the predicted image for the target block by performing right shift, by a predetermined number, of a result of adding at least (a) a result of a multiplication of a first value and an intra predicted sample value which is obtained by intra-prediction for the target block and (b) a result of a multiplication of a second value and an inter predicted sample value which is obtained by inter-prediction for the target block, the second quantization matrix for inter-prediction is used as the quantization matrix to be used to inverse-quantize the quantized transform coefficients, and wherein the first value and the second value are determined from a single weight value.

* * * * *